United States Patent [19]
Pels

[11] Patent Number: 6,109,229
[45] Date of Patent: Aug. 29, 2000

[54] AUXILIARY STARTER UNIT FOR USE WITH A DIESEL ENGINE, AND METHOD FOR STARTING A DIESEL ENGINE

[75] Inventor: Thomas Pels, Achern, Germany

[73] Assignee: ISAD Electronics Systems GmbH & Co. KG, Kohn, Germany

[21] Appl. No.: 09/389,549

[22] Filed: Sep. 3, 1999

Related U.S. Application Data

[63] Continuation of application No. PCT/EP98/01298, Mar. 6, 1998, which is a continuation of application No. PCT/EP98/01297, Mar. 6, 1998.

[30] Foreign Application Priority Data

Mar. 19, 1997 [DE] Germany .......................... 197 09 298
Jul. 19, 1997 [DE] Germany .......................... 197 30 713

[51] Int. Cl.$^7$ ...................................................... F02N 17/02
[52] U.S. Cl. ................................... 123/179.6; 123/179.21
[58] Field of Search .......................... 123/179.21, 179.6, 123/145 A, 549

[56] References Cited

U.S. PATENT DOCUMENTS

| | | | |
|---|---|---|---|
| 3,463,995 | 8/1969 | Herold | 320/6 |
| 4,375,205 | 3/1983 | Green | 123/179.21 |
| 4,962,300 | 10/1990 | Watanabe | 123/179.21 |
| 5,041,776 | 8/1991 | Shirata et al. | 320/1 |
| 5,050,545 | 9/1991 | Shirata et al. | 123/179 |
| 5,146,095 | 9/1992 | Tsuchiya et al. | 290/38 |
| 5,175,439 | 12/1992 | Härer et al. | 307/10.1 |
| 5,207,194 | 5/1993 | Clerici | 123/179.1 |
| 5,525,891 | 6/1996 | Meyer et al. | 320/15 |
| 5,635,771 | 6/1997 | Mertl et al. | 307/10.7 |

FOREIGN PATENT DOCUMENTS

| | | |
|---|---|---|
| 0 390 398 A1 | 10/1990 | European Pat. Off. . |
| 0 403 051 A1 | 12/1990 | European Pat. Off. . |
| 0 420 379 B1 | 4/1991 | European Pat. Off. . |
| 0 533 037 B1 | 3/1993 | European Pat. Off. . |
| 0 688 698 A2 | 12/1995 | European Pat. Off. . |
| 37 13 835 A1 | 11/1988 | Germany . |
| 37 43 317 A1 | 6/1989 | Germany . |
| 40 28 242 A1 | 3/1992 | Germany . |
| 41 35 025 A1 | 4/1992 | Germany . |
| 44 22 256 A1 | 1/1996 | Germany . |
| 195 41 001 | 2/1997 | Germany . |

(List continued on next page.)

OTHER PUBLICATIONS

VDI–Berichte Nr. 1165, 1994, pp. 201–215, R. Knorr and B. Willer *"Neue Kondersatoren für die Energiespeicherung-"* (German with Abstract).

*International Search Report* concerning International Application Serial No. PCT/EP98/01297, European Patent Office, dated Jul. 14, 1998, 6 pages.

*International Search Report* concerning International Application Serial No. PCT/EP98/01298, European Patent Office, dated Jul. 14, 1998, 6 pages. (with Translation).

*Primary Examiner*—Henry C. Yuen
*Assistant Examiner*—Arnold Castro
*Attorney, Agent, or Firm*—Marshall, O'Toole, Gerstein, Murray & Borun

[57] ABSTRACT

An auxiliary starter unit is disclosed for facilitating starting of a diesel engine. The auxiliary starter unit includes a heater positioned in proximity to the diesel engine to improve a starting characteristic of the diesel engine. The auxiliary starter unit also includes an inverter having an intermediate circuit. The auxiliary starter unit is further provided with an energy storage device located to receive electrical energy from the intermediate circuit, and a controlled switch having a closed state and an open state. The controlled switch is positioned to couple the energy storage device in circuit with the heater to deliver electrical energy thereto. Additionally, the auxiliary starter unit includes a heating controller in communication with the controlled switch for selectively causing the controlled switch to enter the closed state to thereby supply the heater with electrical energy at an operating voltage which is higher than the operating voltage of an electrical system associated with a vehicle driven by the diesel engine.

38 Claims, 3 Drawing Sheets

FOREIGN PATENT DOCUMENTS

| | | |
|---|---|---|
| 195 32 163 A1 | 3/1997 | Germany . |
| 02 175 350 | 7/1990 | Japan . |
| 02 175 351 | 7/1990 | Japan . |
| 07 305 672 A | 11/1995 | Japan . |
| 126 5388 A1 | 10/1986 | Russian Federation . |
| WO 93/11003 | 6/1993 | WIPO . |
| WO 97/08439 | 3/1997 | WIPO . |

AUXILIARY STARTER UNIT FOR USE WITH A DIESEL ENGINE, AND METHOD FOR STARTING A DIESEL ENGINE

RELATED APPLICATION

This Application is a con. of PCT/EP98/01298 filed Mar. 6, 1998 and a con. of PCT/EP98/01297 filed Mar. 6, 1998.

FIELD OF THE INVENTION

The invention relates generally to diesel engines, and, more particularly, to an auxiliary starter unit for use with a diesel engine, and a method for starting a diesel engine.

BACKGROUND OF THE INVENTION

The ease with which diesel engines start diminishes at low temperatures. On the one hand, an increase in friction moment is responsible for this increasing reluctance to start. On the other hand, leakage and heat losses during compression of the air reduce the final compression pressure and the final compression temperature to such an extent that starting without an auxiliary starter is no longer possible. The temperature limit at which starting becomes impossible generally depends on the engine design. For example, direct injection diesel engines with a one-part combustion chamber (called DI engines below) have lower heat losses and, thus, exhibit better starting behavior, than precombustion chamber and swirl chamber engines which have a divided combustion chamber.

Sheathed-element glow plugs are ordinarily used in smaller-volume DI engines, as well as in engines with a divided combustion chamber, in order to improve starting behavior. The glow-plug of the element extends into the combustion chamber or chambers of the engine. In addition to sheathed-element glow plugs, glow plugs with an exposed incandescent wire are also common. In large-volume diesel engines auxiliary starting is often based on preheating of the air drawn in to the engine by means of electrically heatable heater plugs or heating flanges.

In order to be able to start the diesel engine at low temperatures, the heating device, (for example, the sheathed-element glow plugs), is supplied with electrical power from the vehicle battery. The heating device converts the electrical power to heat. The electrical power available during this pre-ignition heating process is limited by the maximum possible discharge current of the battery. The maximum possible discharge current diminishes with diminishing temperature and, therefore, behaves opposite to the power requirement as a function of temperature. A temperature sensor incorporated in an ignition control device controls the duration of the required pre-ignition time. The end of the pre-ignition time, (i.e., the onset of readiness to start), is noted, for example, by extinction of a control light.

Because of the limited feed power, the pre-ignition time in now common small-volume DI engines is about 2 to 5 seconds (during a cold start). This relatively long waiting time before the onset of the starting readiness condition represents a certain safety risk in hazardous situations in which immediate driving off is necessary, as well as an adverse effect on comfort.

Various proposals have already been made for further development of pre-ignition units. For example, it is known from DE 37 13 835 A1 that glow plugs of a diesel engine can be operated with an overvoltage in order to shorten the heat-up time. The operation of 6-volt glow plugs with a voltage of 12-volts is mentioned as an example of this approach.

EP 0 420 379 B1 proposes supplying glow plugs for a diesel engine from a series circuit of two capacitors that are connected in parallel during charging. This parallel/series alternating circuit feeds the glow plugs with twice the battery voltage.

DE 37 43 317 A1 describes the general state of the art concerning current supply in motor vehicles. It discloses the supply of other consumers (i.e., not glow plugs or the like) from a dc intermediate circuit with increased intermediate circuit voltage. A dc intermediate circuit with increased intermediate circuit voltage is also described, for example, in DE 195 32 163 A1.

Under practical conditions, the previous proposals to supply sheathed-element glow plugs and the like from capacitor accumulators have not gained acceptance. Other proposals, which supply glow plugs with a slight overvoltage obtained from the vehicle battery do shorten the required ignition times, but apparently have not gained widespread acceptance.

SUMMARY OF THE INVENTION

In accordance with an aspect of the invention, an auxiliary starting unit is provided for facilitating starting of a vehicle having a diesel engine and an electrical system associated with a first operating voltage level. The auxiliary starting unit includes at least one heater positioned in proximity to the diesel engine to improve a starting characteristic of the diesel engine. The auxiliary starting unit also includes an inverter having an intermediate circuit. The intermediate circuit is associated with a second operating voltage which is higher than the first operating voltage. The auxiliary starting unit also includes an energy storage device located to receive electrical energy from the intermediate circuit, and a controlled switch having a closed state and an open state. The controlled switch is positioned to couple the energy storage device in circuit with the at least one heater to deliver electrical energy thereto. Additionally, the auxiliary starting unit includes a heating controller in communication with the controlled switch for selectively causing the controlled switch to enter the closed state to thereby supply the at least one heater with electrical energy at a third operating voltage. The third operating voltage is higher than the first operating voltage.

Other features and advantages are inherent in the disclosed apparatus or will become apparent to those skilled in the art from the following detailed description and its accompanying drawings.

DESCRIPTION OF THE PREFERRED EMBODIMENTS

In the following description and figures, functionally equivalent or similar parts are designated with similar reference numbers.

Figure 1:
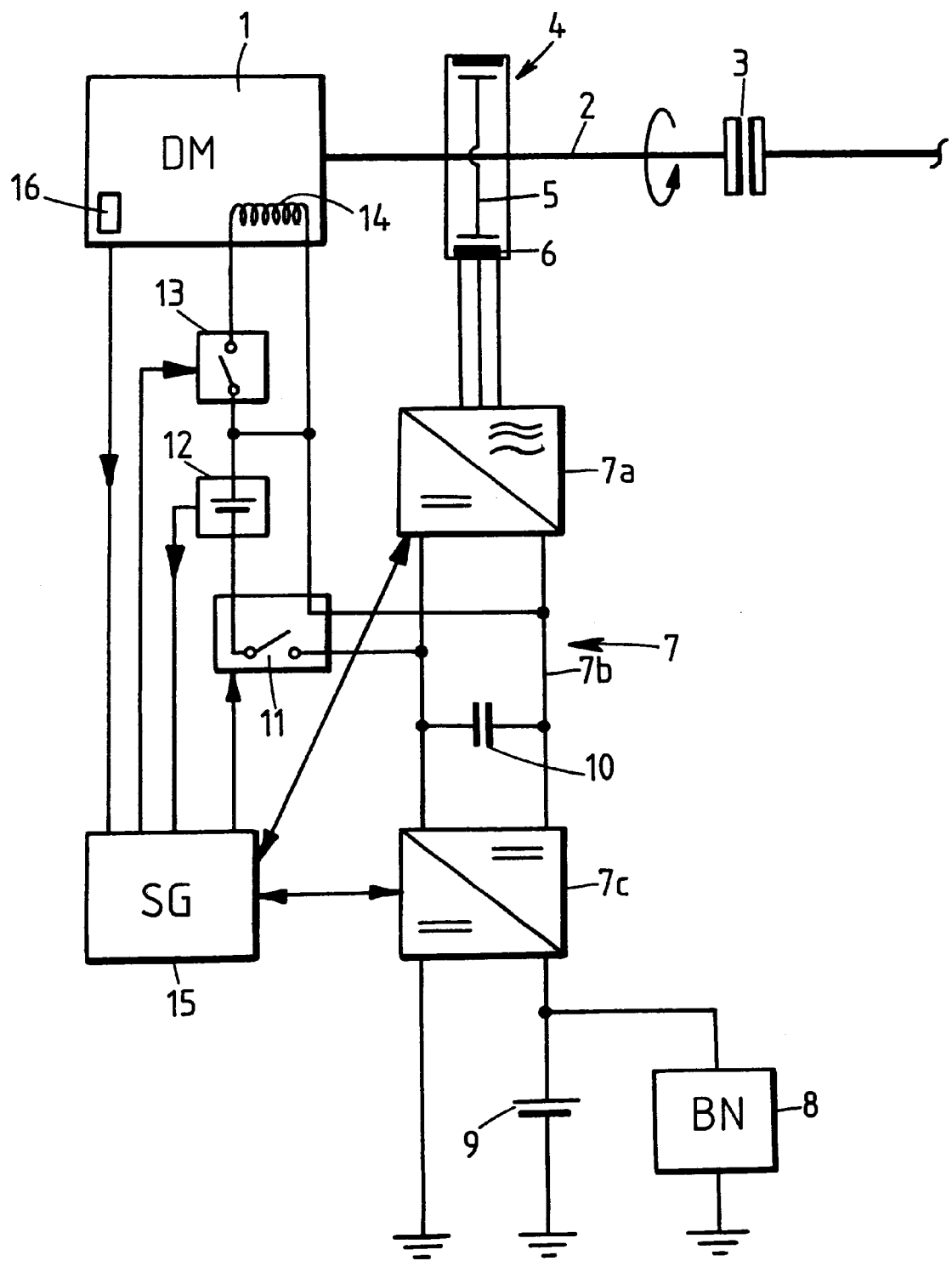
FIG. 1 is a schematic illustration of an exemplary auxiliary starter unit constructed in accordance with the teachings of the instant invention and shown coupled to a drive system of a diesel engine.

An auxiliary starter unit constructed in accordance with the teachings of the invention is shown in FIG. 1 in a preferred environment of use, namely, coupled to a drive system of a diesel engine of a vehicle such as a passenger car. Although the following description focuses on use in a specific environment, persons of ordinary skill in the art will readily appreciate that the teachings of the invention are not limited to any particular environment of use.

The drive system shown in FIG. 1 includes a diesel engine 1 which releases torque via a drive shaft 2 (for example, the crankshaft of diesel engine 1), a clutch 3 and additional parts (not shown) of a drive train to the drive wheels (not shown) of the vehicle. An electric machine 4 (e.g., an asynchronous three-phase machine) serving as a starter and, optionally, as an additional drive unit and generator, is located on the drive shaft 2. The electric machine 4 has a rotor 5 which sits directly upon the drive shaft 2. The rotor 5 is connected to rotate in unison with the shaft 2. The electric machine 4 also includes a stator 6 which is supported on the housing of the diesel engine 1.

The winding (not shown) of the stator 6 is fed with electric currents and voltages of virtually fully adjustable amplitude, phase and frequency by an inverter 7. The inverter 7 is preferably implemented by a dc-intermediate-circuit-inverter which includes electronic switches that cut out, for example, width-modulated pulses from an essentially constant intermediate circuit dc voltage. When averaged by the inductance of the electric machine 4, the width-modulated pulses lead to almost sinusoidal currents of the desired frequency, amplitude and phase.

The inverter 7 is generally constructed from a dc-ac frequency converter 7a on the machine side, a dc intermediate circuit 7b and a dc-dc converter 7c on the electrical system side. The dc-dc converter 7c is connected to a vehicle electrical system 8 and an electrical system long-term accumulator 9. The accumulator 9 is implemented in the illustrated example by an ordinary lead-sulfuric acid battery.

The electrical system 8 and the electrical system battery 9 lie at a low voltage level, (e.g., 12 or 24 volts). In contrast, the intermediate circuit 7b lies at an increased voltage level which advantageously lies in the range between 200 and 400 volts. At high voltages, the semiconductor losses in the frequency (dc-ac) converter 7a are relatively small. The cross sections of the conductor windings of the electric machine 4 can also be dimensioned smaller when designed for operation at high voltages than they can be when intended for operation at low voltages. However, lower voltages that lie roughly in the upper part of the low voltage range, (i.e., above 40 volts), are also advantageous. Complete insulation of the voltage-conducting parts can be dispensed with in the upper part of the low voltage range. On the other hand, the aforementioned advantages associated with the higher voltage already become noticeable in that range.

A capacitor 10 is connected into the intermediate circuit 7b. The capacitor 10 keeps the voltage in the intermediate circuit 7b roughly constant, even during increasing current discharge with high flank steepness (which occurs, for example, during generation of pulses by the frequency converter 7a).

A charging device 11 is also connected to the intermediate circuit 7b. The charging device 11 controls current flow from the intermediate circuit 7b to a short-time storage device or energy accumulator 12. The current from the intermediate circuit 7b can be used, for example, to charge the accumulator 12. In the depicted example, the energy accumulator 12 is charged to the same voltage level as the intermediate circuit 7b and the charging device 11, therefore, functions as a current control device, (in the simplest case as a switch). In other variants (not shown) in which the energy accumulator 12 is charged to higher or lower voltages than the intermediate circuit 7b, the charging device 11 also functions as a voltage converter to change the voltage received from the intermediate circuit 7b to higher or lower voltages.

The energy accumulator 12 is preferably constructed from a parallel circuit of capacitors of high capacitance. However, persons of ordinary skill in the art will readily appreciate that the accumulator 12 can be implemented in many ways without departing from the scope or spirit of the invention. For example, the accumulator 12 may be implemented by one or more short-time batteries.

As shown in FIG. 1, the energy accumulator 12 is connected to a heating device 14 via a controlled switching device 13 (implemented here by power semiconductor switches). The heating device or heater 14 facilitates starting of the diesel engine 1 and may be implemented by, for example, a sheathed-element glow plug extending into the combustion chamber(s) of the diesel engine 1 and/or a so-called heater plug, which preheats the intake air.

The electric machine 4 can function as a generator, (i.e., supply electrical power), after the starting process (during which it draws power from the inverter 7). In addition, it can function as an electrical booster, (i.e., it can support the diesel engine 1 during vehicle accelerations). It can also assume vehicle drive alone at times in the fashion of a hybrid vehicle.

In view of these various functions, the dc-dc converter 7c is designed as a bidirectional converter. On the one hand, when the electric machine 4 is operated as a motor and is supplied with power from the vehicle battery 9, the dc-dc converter 7c can deliver electrical power from the vehicle battery 9 to the intermediate circuit 7b. On the other hand, when the electric machine 4 is operated as a generator, the dc-dc converter 7c can transfer energy from the intermediate circuit 7b to supply the vehicle battery 9 and other consumers in the electrical system 8.

The capacitance of the energy accumulator 12 is preferably dimensioned so that it stores sufficient energy to adequately preheat the diesel engine 1 for a reliable start at low temperatures, (i.e., to pre-ignite it). With larger dimensioning the energy accumulator 12 can also advantageously supply electrical power to the electric machine 4 via the frequency (dc-ac) converter 7a. The energy accumulator 12 also serves with particular advantage to temporarily store the energy required for electrical boosting and to briefly deliver high electrical power via the frequency (dc-ac) converter 7a to the electric machine 4 during vehicle acceleration. For the two last-named applications, the charging device 11 is designed to be bidirectional. This means that the charging device 11 can transfer electrical energy both from the intermediate circuit 7b to the energy accumulator 12 and also in the opposite direction from the energy accumulator 12 to the intermediate circuit 7b. The charging device 11 can optionally have a voltage-increasing or voltage-reducing effect on energy transferred between the accumulator 12 and the intermediate circuit 7b.

As shown in FIG. 1, a higher level control device 15 (which can be implemented, for example, by a programmed microprocessor) controls the inverter 7, (specifically the frequency (dc-ac) converter 7a and the dc-dc converter 7c), the charging device 11 and the switching device 13. In particular, the control device or heating controller 15 delivers control signals to the dc-ac converter 7*a* stipulating the amplitude, phase and frequency of the three-phase voltage to be generated by the frequency converter 7*a*. It also delivers control signals to the dc-dc converter 7*c* stipulating the current amount, current direction and amount of voltage increase or reduction to be produced by the converter 7*c*. The heating controller 15 also stipulates to the charging device 11 the amount of current the device 11 is to draw from (or supply to) the intermediate circuit 7*b*, and, thus, stipulates the current to be supplied to (or removed from) the energy accumulator 12. The control device 15 also controls the switching device 13 and, thus, defines the beginning and end of the heating process (for example, the pre-ignition process). The heating controller 15 receives input signals from a temperature sensor 16 which provides information concerning the coolant temperature of the diesel engine 1.

Figure 2:
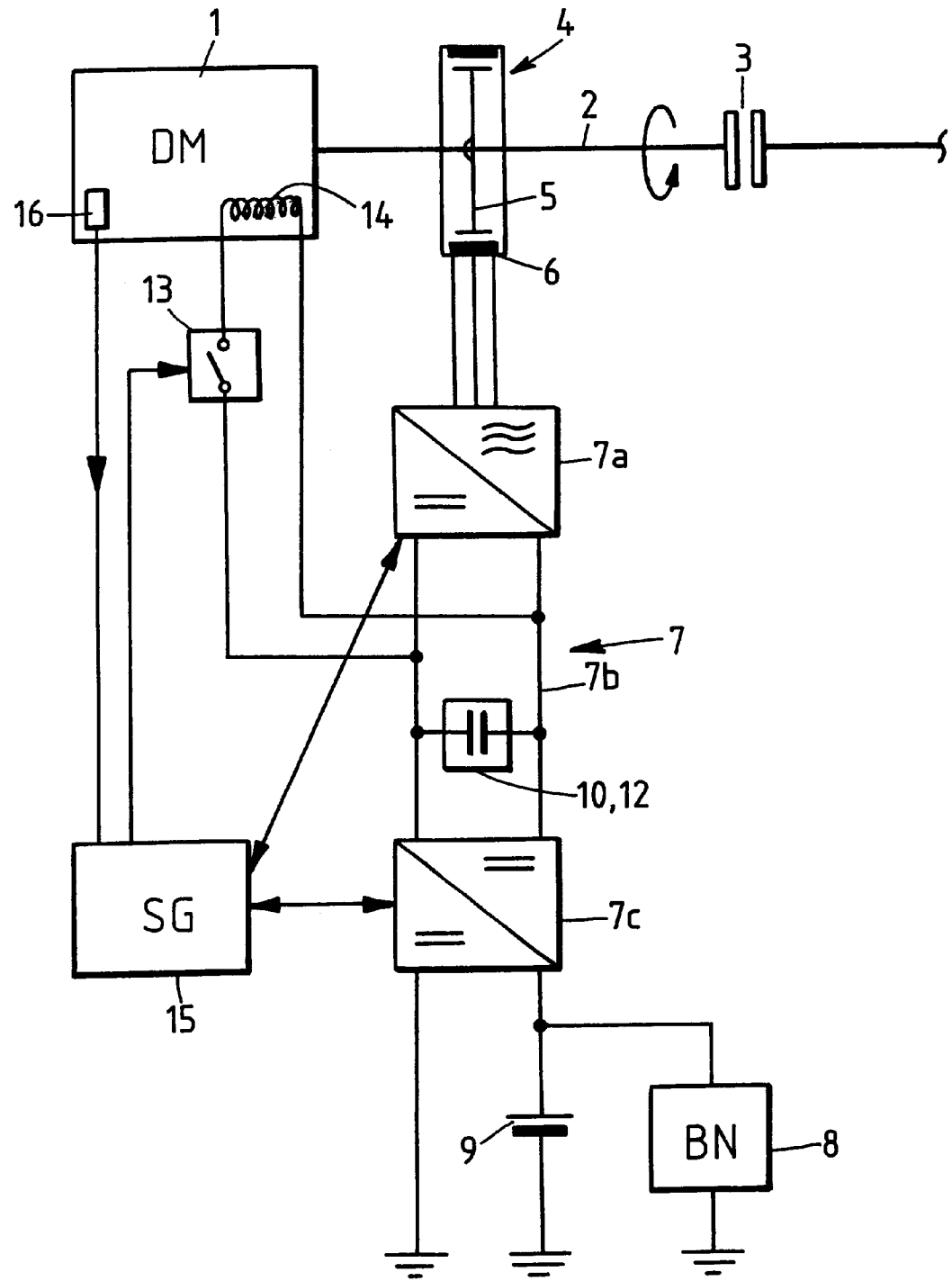
FIG. 2 is a schematic illustration of another exemplary auxiliary starter unit constructed in accordance with the teachings of the instant invention and shown coupled to a drive system of a diesel engine.

The practical example shown in FIG. 2 is similar to the example shown in FIG. 1. However, in contrast to the apparatus of FIG. 1, the intermediate circuit capacitor (or as an alternative a rapid battery) 10 of the apparatus of FIG. 2 assumes the function of the energy accumulator 12. Therefore, the apparatus of FIG. 2 does not include a charging device 11. The intermediate circuit capacitor 10 of FIG. 2 is larger than its counterpart in FIG. 1, such that it has sufficient capacitance for its additional task of storing energy for conversion to heat energy. Since the accumulator 10 is directly connected in the intermediate circuit 7*b*, it is directly charged to the voltage level of the intermediate circuit 7*b*.

Figure 3:
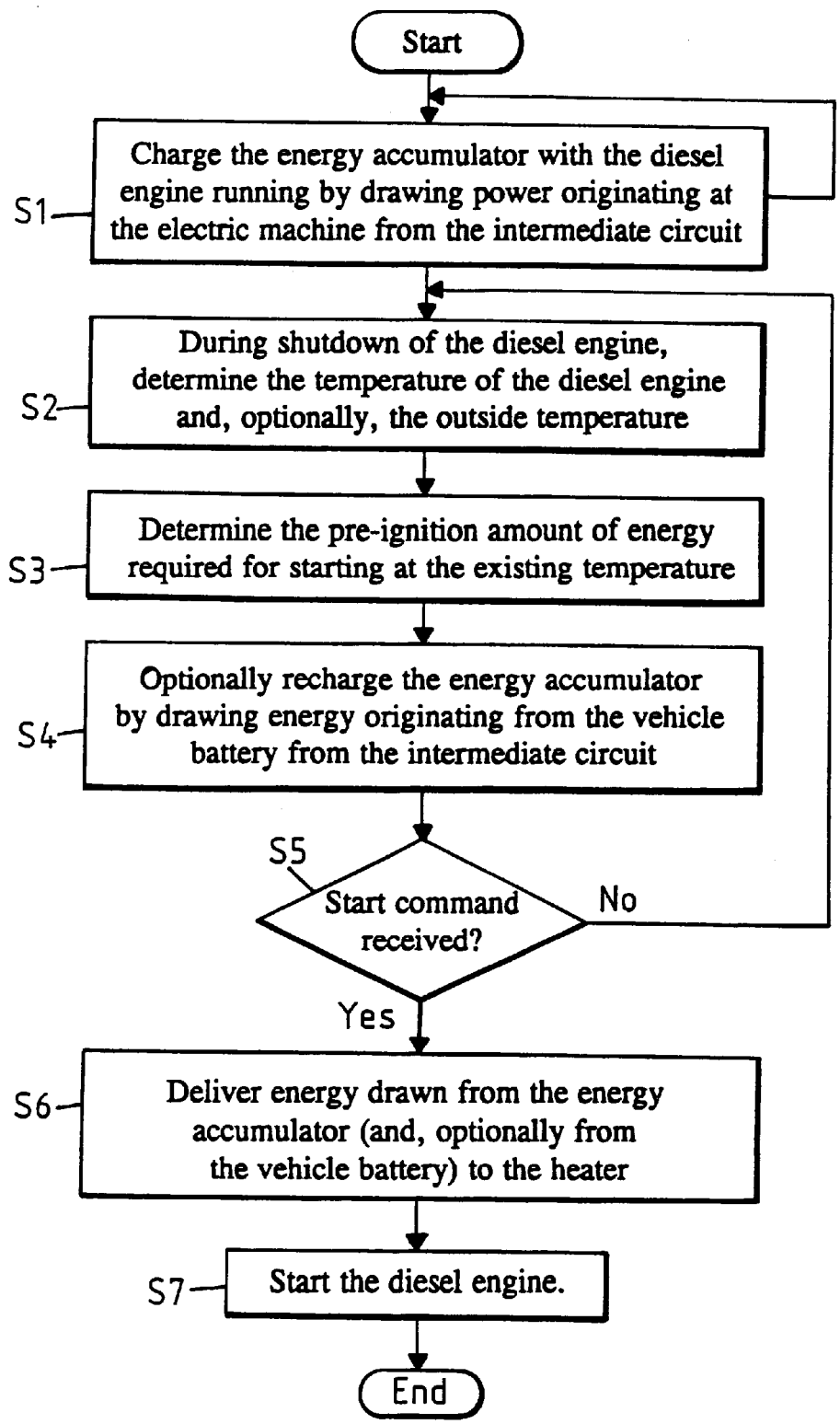
FIG. 3 shows a flowchart depicting exemplary steps for starting a diesel engine with either the auxiliary starter unit depicted in FIG. 1 or the auxiliary starter unit depicted in FIG. 2.

The operation of the auxiliary starter units of FIGS. 1 and 2 is explained below with reference to the flowchart of FIG. 3. In step S1, the energy accumulator 12 is charged. The accumulator 12 is charged to a high stipulated (i.e., predefined) value which corresponds in the example of FIG. 2 (and, optionally, in the example of FIG. 1) to the intermediate circuit voltage. The charging performed in step S1 occurs with diesel engine 1 running and, thus, the charging energy is supplied from the electric machine 4 when functioning as a generator.

However, during longer vehicle shutdown periods, the capacitor accumulator 12 discharges gradually. To counteract this effect, the capacitor accumulator 12 is fully or partially charged by removing energy from the vehicle battery 9 during periods of prolonged shutdown. The amount of energy still present in the energy accumulator 12 during such periods can be determined simply by measuring its output voltage. This voltage is monitored in order to maintain the accumulator 12 in a state of readiness for performing a heating process, (for example, a pre-ignition process). Recharging generally need only occur after a relatively long engine shutdown, since the energy accumulator 12 is generally fully charged when the engine 1 is running, (i.e., to a value that lies well above the minimum value required for auxiliary starting).

For this recharging purpose, the following steps are carried out during engine shutdown. In step S2, the control device 15 determines the instantaneous engine temperature by referencing the measurement information furnished by the temperature sensor 16 and, optionally, determines the ambient temperature by referencing an outside temperature sensor (not shown in FIG. 1). In step S3, the control device 15 references a stored map to determine the amount of energy that is expected to be required for successful starting assistance, for example, in the form of pre-ignition and/or preheating at the temperature (or temperatures) determined in the preceding step. If the amount of energy still present in the energy accumulator 12 falls short of the necessary amount determined in the preceding step, in step S4 the control device 15 causes recharging of the energy accumulator 12 by, in the example of FIG. 1, transferring energy originating from the vehicle battery 9 from the intermediate circuit 7*b* to the accumulator 12 via the charging circuit 11 or, in the example of FIG. 2, transferring energy from the vehicle battery 9 to the intermediate circuit 7*b*. The amount of energy still present in the energy accumulator 12 can be determined simply by measuring its output voltage.

In step S5, the control device 15 determines whether a command was issued to start the diesel engine, (for example, by activation of an ignition key). If no such command has been received, the control device 15 executes steps S2 to S5 repeatedly in order to keep the energy accumulator 12 permanently in readiness, (i.e., in a state of charging sufficient for successful starting assistance). In step S6 (after a command to start the engine 1 has been received), the control device 15 ensures that the heating device 14 (for example, sheathed-element glow plugs) is supplied with very high power from the energy accumulator 12 by closing the switching device 13 briefly. Substantially all of the energy delivered to the heater 14 is converted to heat energy in a very short time so that very short preheating times of less than 1 second are attainable. Finally, the diesel engine 1 is started in step S7.

From the foregoing, persons of ordinary skill in the art will readily appreciate that the disclosed apparatus permit practically delay-free starting of a cold diesel engine. Therefore, on the one hand, the disclosed apparatus improve traffic safety, since they permit more rapid driving off in the event of a hazard and, on the other hand, the disclosed apparatus increase comfort. Apparatus such as those disclosed herein may, thus, increase acceptance of diesel vehicles. As a result, the disclosed apparatus make a contribution to environmental protection and the responsible use of scarce resources.

From the foregoing, persons of ordinary skill in the art will further appreciate that the disclosed apparatus connect an energy accumulator 12 for storing and delivering energy to be used by a heating device 14 to the intermediate circuit 7*b* of an inverter 7, not to the electrical system 8 of the serviced vehicle. This arrangement ensures that the energy accumulator 12 can be charged to relatively high voltages with only limited additional expense. The heating device 12 can, thus, be supplied with relatively high power. This permits significantly shorter preheating times (for example, pre-ignition times) than in the prior art.

It should be noted that the supply of the heating device 14 from the energy accumulator 12 mentioned above is preferably, but in no way necessarily, meant in the exclusive sense. Thus, without departing from the scope or spirit of the invention it is possible that only part of the energy for the heater 14 is taken from the energy accumulator 12, while another part (lying at lower voltage) is taken from the vehicle battery 9. (An exemplary method for controlling the dc-dc converter 7*c* to supply selective amounts of power from the accumulator 12 and/or the vehicle battery 9 to the heater 14 is disclosed in U.S. application Ser. No. 9/389,992, which was filed on Sep. 3, 1999 and which is hereby incorporated by reference in its entirety. Energy can also be fully drawn from the energy accumulator 12 only at times, while at other times it can occur fully or partially from the vehicle battery 9 without departing from the scope or spirit of the invention. By way of another example, if further supply of the heating device 14 is required after the diesel engine has been started (for example, after ignition in the first start-up phase or ignition during thrust operation), the heater 14 can be supplied by the generator 4. (See U.S.

application Ser. No. 9/389,992) for a discussion on how to control the dc-dc converter 7c to achieve this end.) In each of the above cases, the energy delivered to the heater 14 is preferably taken from the intermediate circuit.

Two advantageous alternatives are disclosed for implementing the energy accumulator 12. In the first alternative shown in FIG. 1, a charging device 11 is connected between the energy accumulator 12 and the intermediate circuit 7b. The charging device 11 controls the charging of the energy accumulator 12 with energy from the intermediate circuit 7b. In the simplest case, the energy accumulator 12 is charged to the voltage level of the intermediate circuit 7b. In such a case, the charging device 11 (in the case of a dc intermediate circuit) is then implemented by a switch which can both connect and disconnect the energy accumulator 12 directly to and from the intermediate circuit 7b. However, it is also possible to charge the energy accumulator 12 to higher or lower voltages than the voltage prevailing in the intermediate circuit 7b. In such circumstances the charging device 11 is preferably implemented as a voltage converter (e.g., a dc-dc converter). If the intermediate circuit 7b is an ac circuit, the charging device 11 can also be implemented by a rectifier.

In the second alternative shown in FIG. 2, the energy accumulator 12 is connected directly into the intermediate circuit 7b. Preferably, the accumulator 10 (for example, a capacitor) is located in the dc intermediate circuit 7b to keep the voltage in the intermediate circuit 7b roughly constant even during increasing current takeoff with a large flank steepness. This accumulator 10 is preferably increased in size to also perform the function of the accumulator 12.

As mentioned above, the energy accumulator 12 is preferably implemented by a capacitor and/or a short-time battery. The capacitor is preferably formed, for example, by a parallel circuit of several capacitors with sufficiently high capacitance. "Short-time battery" is understood to mean a highly loadable, rapidly dischargeable battery, as described, for example, in WO 97/08439. In particular, the discharge time of such a battery is less than 7 minutes; and preferably less than 4 minutes. Discharge time is understood here to mean the minimal duration between the fully charged and fully discharged states at the highest admissible long-term load. The maximum discharge current is preferably more than 10 CA, and even more preferably greater than 15 CA. ("CA" is a special unit which characterizes the discharge current of a battery. Its dimension is "A" (Ampere). It is defined as the ratio of the discharge current to the rated capacity of the battery. For example, a battery with a rate capacity of 4 Ah is discharged with 0.1 CA at 400 mA, 1 CA at 4 A, and 10 CA at 40 A.) The power density is preferably more than 250 W/kg, and even more preferably greater than 300 W/kg. The short-time battery can be implemented by a nickel/iron system, or more preferably by an alkaline secondary system, or a nickel/cadmium system. The short-time battery contains sintered electrodes, preferably designed as sintered plates, sintered foil plates, or a fiber structure electrode. The electrode in the latter case preferably comprises a three-dimensional polypropylene fiber structure.

The heating device 14 is preferably implemented by a sheathed-element glow plug (i.e., a plug with an encapsulated glow wire), a glow plug (with exposed glow wire), a heater plug and/or a heating flange. Whereas the first two implementation examples directly cause ignition of the fuel, the last two implementation examples serve to preheat the intake air.

The following describes preferred values for the increased voltage level of the intermediate circuit 7b. A voltage level that lies at the upper edge of the low-voltage range is preferred, in which precautions must still be taken against touching of conductors (contact protection). Such voltages are greater than about 40 volt. Much higher voltages, for example in the range from 200 to 400 volt, are particularly preferred. These higher voltages permit transport of relatively high powers at low currents.

As mentioned above, the intermediate circuit 7b is preferably implemented by a dc intermediate circuit 7b. As also mentioned above, the inverter 7 serves to supply a starter/generator 4. The starter/generator 4 is advantageously implemented by a three-phase machine. For operation as a starter, the inverter 7 takes electrical power from a battery 9 arranged in the low voltage electrical system 8, converts this power to the increased voltage level of the intermediate circuit 7b, (for example, by means of a dc-dc converter 7c), and converts the energy taken from the intermediate circuit 7b to alternating or three-phase current with freely adjustable frequency, amplitude and phase (for example, by means of a dc-ac converter 7a). The inverter 7 also generates rotating fields during generator operation. Since in such operation the current direction is reversed relative to current flow in starter operation, the electrical energy generated by the electric machine 4 is initially fed to the intermediate circuit 7b at the increased voltage level and then, for example, after a voltage reduction, fed to the low voltage battery 9 or other consumers.

Preferably, the energy accumulator 12 has an additional function in addition to supplying the heating device 14. In particular, the accumulator 12 serves to supply ("supply" is not to be understood here in the exclusive sense, i.e., additional energy sources can be involved) the electric machine 4. This approach is particularly advantageous in those operating states in which the electric machine 4 has a high power requirement, for example, during starting, or when the electric machine 4 supports the internal combustion engine 1 during acceleration of the vehicle (electrical booster), or when the electric machine 4 at times fully assumes propelling the vehicle (in the fashion of a hybrid vehicle).

Although certain embodiments of the teachings of the invention have been described herein, the scope of coverage of this patent is not limited thereto. On the contrary, this patent covers all instantiations of the teachings of the invention fairly falling within the scope of the appended claims either literally or under the doctrine of equivalents.

What is claimed is:

1. For use with a vehicle having a diesel engine and an electrical system, the electrical system being associated with a first operating voltage level, an auxiliary starting unit for facilitating starting of the diesel engine comprising:

at least one heater positioned to improve a starting characteristic of the diesel engine;

an inverter having an intermediate circuit, the intermediate circuit being associated with a second operating voltage, the second operating voltage being higher than the first operating voltage;

an energy storage device located to receive electrical energy from the intermediate circuit;

a controlled switch having a closed state and an open state, the controlled switch being positioned to couple the energy storage device in circuit with the at least one heater to deliver electrical energy thereto; and a heating controller in communication with the controlled switch for selectively causing the controlled switch to enter the closed state to thereby supply the at least one heater with electrical energy at a third operating voltage, the third operating voltage being higher than the first operating voltage.

2. An auxiliary starter unit as defined in claim 1 wherein the third operating voltage is substantially the same as the second operating voltage.

3. For use with a vehicle having a diesel engine and an electrical system, the diesel engine being operatively coupled to a crankshaft, the electrical system being associated with a first operating voltage level, an auxiliary starting unit for facilitating starting of the diesel engine comprising:
an electrical starter operatively coupled to the crankshaft;
at least one electrically powered heater positioned to improve a starting characteristic of the diesel engine;
an inverter in communication with the electrical starter for selectively driving the electrical starter, the inverter having an intermediate circuit, the intermediate circuit being associated with a second operating voltage, the second operating voltage being higher than the first operating voltage;
an energy storage device located to receive electrical energy from the intermediate circuit and adapted to selectively supply electrical energy at a third operating voltage to at least one of the electrical starter and the at least one heater; and
a heating controller for selectively supplying the at least one heater with electrical energy from the energy storage device.

4. An auxiliary starting unit as defined in claim 3 further comprising a charging device coupled in circuit with the energy storage device and the intermediate circuit for controlling charging of the energy storage device from the intermediate circuit.

5. An auxiliary starting unit as defined in claim 4 wherein the charging device comprises a controlled switch.

6. An auxiliary starting unit as defined in claim 4 wherein the charging device comprises a voltage converter.

7. An auxiliary starting unit as defined in claim 3 wherein the energy storage device is coupled directly within the intermediate circuit.

8. An auxiliary starting unit as defined in claim 3 wherein the energy storage device comprises at least one of a capacitor and a battery.

9. An auxiliary starting unit as defined in claim 3 wherein the at least one heater comprises at least one of a glow plug, a heating plug, and a heating flange.

10. An auxiliary starting unit as defined in claim 3 wherein the second operating voltage lies above 40 volts.

11. An auxiliary starting unit as defined in claim 3 wherein the second operating voltage lies above 100 volts.

12. An auxiliary starting unit as defined in claim 3 wherein the second operating voltage lies in a range between approximately 200 volts and approximately 400 volts.

13. An auxiliary starting unit as defined in claim 3 wherein the intermediate circuit is a DC circuit.

14. An auxiliary starting unit as defined in claim 3 wherein the electric starter also operates as a generator.

15. An auxiliary starting unit as defined in claim 3 wherein the electric starter comprises a three-phase electrical machine with a rotor and a stator.

16. An auxiliary starting unit as defined in claim 3 wherein the electric starter selectively operates as at least one of a generator and an auxiliary drive motor.

17. An auxiliary starting unit as defined in claim 16 wherein when the electric starter operates as the auxiliary drive motor, the electric starter is at least partially supplied with energy by the energy storage device.

18. An auxiliary starting unit as defined in claim 3 further comprising a controlled switch, wherein the heating controller is in communication with the controlled switch and the heating controller supplies the at least one heater with energy from the energy storage device by changing a state of the controlled switch.

19. An auxiliary starting unit as defined in claim 3 wherein the second and third operating voltages are substantially the same.

20. An auxiliary starting unit as defined in claim 3 wherein the third operating voltage is higher than the first operation voltage.

21. For use with a vehicle having a diesel engine and an electrical system, the diesel engine being operatively coupled to a crankshaft, the electrical system being associated with a first operating voltage level, an auxiliary starting unit for facilitating starting of the diesel engine comprising:
an electrical starter operatively coupled to the crankshaft;
at least one electrically powered heater positioned to improve a starting characteristic of the diesel engine;
an inverter in communication with the electrical starter for selectively driving the electrical starter by supplying the starter with electrical energy, the inverter having an intermediate circuit and a voltage converter, the intermediate circuit being associated with a second operating voltage, the second operating voltage being higher than the first operating voltage;
a vehicle battery coupled to the intermediate circuit via the voltage converter;
an energy storage device located to receive electrical energy from the intermediate circuit and adapted to selectively supply electrical energy at a third operating voltage to at least one of the electrical starter and the at least one heater;
a heating controller for selectively supplying the at least one heater with electrical energy, a first portion of the electrical energy supplied to the at least one heater being taken from the energy storage device and a second portion of the electrical energy supplied to the at least one heater being taken from the vehicle battery.

22. An auxiliary starting unit as defined in claim 21 wherein the second and third operating voltages are substantially the same.

23. An auxiliary starting unit as defined in claim 21 further comprising a charging device coupled in circuit with the energy storage device and the intermediate circuit for controlling charging of the energy storage device from the intermediate circuit.

24. An auxiliary starting unit as defined in claim 23 wherein the charging device comprises a controlled switch.

25. An auxiliary starting unit as defined in claim 23 wherein the charging device comprises a voltage converter.

26. An auxiliary starting unit as defined in claim 21 wherein the energy storage device is coupled directly within the intermediate circuit.

27. An auxiliary starting unit as defined in claim 21 wherein the energy storage device comprises at least one of a capacitor and a battery.

28. An auxiliary starting unit as defined in claim 21 wherein the at least one heater comprises at least one of a glow plug, a heating plug, and a heating flange.

29. An auxiliary starting unit as defined in claim 21 wherein the second operating voltage lies above 40 volts.

30. An auxiliary starting unit as defined in claim 21 wherein the second operating voltage lies above 100 volts.

31. An auxiliary starting unit as defined in claim 21 wherein the second operating voltage lies in a range between approximately 200 volts and approximately 400 volts.

32. An auxiliary starting unit as defined in claim 21 wherein the intermediate circuit is a DC circuit.

33. An auxiliary starting unit as defined in claim 21 wherein the electric starter also operates as a generator.

34. An auxiliary starting unit as defined in claim 21 wherein the electric starter comprises a three-phase electrical machine with a rotor and a stator.

35. An auxiliary starting unit as defined in claim 21 wherein the electric starter selectively operates as at least one of a generator and an auxiliary drive motor.

36. An auxiliary starting unit as defined in claim 35 wherein when the electric starter operates as the auxiliary drive motor, the electric starter is at least partially supplied with energy by the energy storage device.

37. An auxiliary starting unit as defined in claim 21 further comprising a controlled switch, wherein the heating controller is in communication with the controlled switch and the heating controller supplies the at least one heater with energy from the energy storage device by changing a state of the controlled switch.

38. An auxiliary starting unit as defined in claim 21 wherein the third operating voltage is higher than the first operating voltage.

* * * * *